United States Patent [19]

Poppe, Jr et al.

[11] 3,754,260

[45] Aug. 21, 1973

[54] LORAN-C THIRD CYCLE IDENTIFICATION THROUGH THE USE OF OMEGA

[75] Inventors: Martin C. Poppe, Jr; John M. Beukers; James I. Meranda; Christian B. Williams, all of Stony Brook, N.Y.

[73] Assignee: Beukers Laboratories, Inc., Hauppauge, N.Y.

[22] Filed: Dec. 2, 1971

[21] Appl. No.: 204,016

[52] U.S. Cl. ........................ 343/103 R, 343/105 R
[51] Int. Cl. ........................... G01s 1/24, G01s 1/30
[58] Field of Search .................... 343/103 R, 105 R, 343/6 R

[56] References Cited
UNITED STATES PATENTS

| | | | |
|---|---|---|---|
| 3,689,926 | 9/1972 | Honoré et al. | 343/105 R |
| 3,070,796 | 12/1962 | Gray | 343/105 R |

Primary Examiner—Benjamin A. Borchelt
Assistant Examiner—A. M. Psitos
Attorney—Nichol M. Sandoe et al.

[57] ABSTRACT

A tracking method and system for tracking the position of a remote target such as a weather balloon is disclosed which utilizes both Loran-C and Omega navigation techniques. The Loran-C receiver at the tracking station is locked on to an indeterminate cycle, e.g., one of the third cycle ± 2 cycle, of the received Loran pulses from the weather balloon to provide ambiguous Loran position data. Second ambiguous position data is derived from Omega signals also received from the remote target. The ambiguous Loran position data is employed to resolve the ambiguity of the Omega position data, after which the resolved Omega position data is employed to obtain precise Loran position data from the ambiguous Loran position data. The Loran receiver is then set to lock on to the proper cycle corresponding to the corrected Loran position data.

11 Claims, 14 Drawing Figures

INVENTORS
MARTIN C. POPPE
JOHN M. BEUKERS
JAMES I. MERANDA
CHRISTIAN B. WILLIAMS
BY
Sandoe, Hopgood & Calimafde
ATTORNEYS

LORAN-C THIRD CYCLE IDENTIFICATION THROUGH THE USE OF OMEGA

The present invention relates generally to navigation, and more particularly to an improved method and system for tracking distant objects by a combination of Loran-C and Omega navigation techniques.

A standard Loran long range navigation station includes a master transmitter station and a series of slave transmitting stations spaced from each other at fixed known locations. The master station transmits a pulsed signal which upon arrival at one of the slave stations triggers that slave station to transmit a similar pulse at the same frequency. A direct time-difference ($T_D$) reading is obtained at the Loran receiver by comparing the pulses received from the master and slave stations.

For each slave station, a particular value of the time delay establishes a locus in the form of a hyperbola. For each pair of slave station tied to a single master, a pair of intersecting hyperbolic loci are established over a given area to form a grid. A navigator by the observation of two time delays is thus able to determine a position fix at the intersection of the loci corresponding to the two time delays.

The most commonly employed Loran navigation techniques in use at the present time is the Loran-C system in which many of the deficiencies of the earlier Loran systems are largely overcome by means of cycle matching within the pulse. Loran-C techniques are presently used to cover much of the Northern hemisphere. Each Loran station transmits pulses of a 100-kHz carrier. Those signals are transmitted by groundwave as well as by skywave, the former being able to be received at distances of up to 1,000 miles, and the latter at considerably greater distances, although groundwave transmission is more stable and is thus preferred.

The Omega navigation system establishes a hyperbolic grid pattern or lines of position that can be used for navigation and position fixing. The presently installed Omega stations transmit on three VLF frequencies, 10.2 kHz, 11.30 kHz and 13.6 kHz. Each station transmits once during each 10-second interval with a transmission interval of approximately 1 second. The 10 second interval consists of eight segments, and each station transmits the three Omega frequencies during assigned segments with a 0.2 second separation between the transmission of adjacent stations. The segments vary in length from 0.9 to 1.2 seconds to aid in station identification.

Navigation by use of the Omega signals is accomplished through the reception and phase comparison of three or more stations with respect to each other, or two stations with respect to a stable oscillator. After obtaining the phase differences between three stations, the geographical position may be determined by plotting on an Omega chart or by making calculations.

In conventional Loran-C navigation, the time displacement measurement is made with respect to a specified cycle, usually the third cycle, in the succeeding Loran-C pulses. The third cycle of the Loran-C pulse envelope is usually selected for this purpose since its amplitude is significantly above that of noise and it occurs prior to the appearance of the skywave signal. Third-cycle identification works reliably when the Loran-C transmitter and receiver are close.

The use of a balloon-borne radiosonde for the purpose of obtaining atmospheric meteorological data is a well established procedure that is performed daily by a large number of ocean station vessels or tracking stations. The data is obtained from the radiosonde four times each day and the data thus obtained is employed to prepare daily weather maps, and is also made available to aircraft flight centers and weather forecasting agencies.

In a typical weather sounding procedure a helium-filled balloon carrying a radiosonde is released into the atmosphere. The radiosonde is a device that includes a radio transmitter as well as meteorological data sensing device such as that described in copending application Ser. No. 68,990 entitled Radiosonde Met Data Oscillator and Pulse Stretcher, and assigned to the assignee of the instant application. Those devices commonly include an aneroid barometer which senses air pressure and produces corresponding electrical signals that are telemetered to the tracking station, and serves also as the mechanical movement for an actuator, which in turn permits the sequential transmission of temperature, humidity, and calibration data. Wind speed and direction are obtained by tracking the balloon's progress.

Loran navigation techniques are typically employed in tracking the position of the balloon by placing a Loran receiver and retransmitter on the balloon which receives and then retransmits a Loran signal to the tracking station along with the meteorological data. In this procedure, reliable third-cycle identification is usually not possible, largely as a result of the compression of the amplitude dynamic range that occurs as a result of the signal retransmission. When Loran techniques are employed in tracking weather balloons, the data obtained may thus be in error by as much as 4 miles, since the time difference information obtained may be in error due to the difficulty of accurately identifying corresponding third cycles in the series of retransmitted Loran-C signals.

The problem of reliable third-cycle identification could be resolved by increasing the power of the remote balloon-carried transmitter so that the entire dynamic range of the Loran-C signal is retransmitted to the tracking station, or in the alternative, a log compression technique may be employed to permit third-cycle identification. Each of these techniques would, however, excessively increase the cost and complexity of the remote transmitter and make it unacceptable for use in a remote weather balloon or the like, in which the retransmitter, since it is generally not recaptured after a sounding operation, must be relatively inexpensive.

It is an object of the invention to provide an improved tracking system and method in which Loran-C navigation techniques are employed in applications in which third-cycle identification cannot be reliably obtained.

It is a further object of the invention to provide a method and a system permitting the use of Loran-C techniques to accurately determine the location of a remote object from which the Loran-C signal is retransmitted to a tracking station.

It is another object of the invention to provide an improved navigation and tracking system and method employing both Loran and Omega navigation techniques.

In accordance with the invention, the time difference from the received Loran signals are determined to within two cycles of the third cycle of the Loran pulse.

This provides coarse Loran latitude-longitude coordinate information which is ambiguous and inaccurate as a result of the ambiguity of the third cycle identification.

A retransmitted Omega navigation signal is also received at the tracking station which is more accurate than the ambiguous Loran information but as a result of the continuous-wave nature of Omega, the Omega position information is also ambiguous and may establish a plurality of probable Omega zones or lanes of the tracked balloon. One of those zones, however, falls within the area defined by the ambiguous Loran-C information. The computed, ambiguous Loran-C time-difference, after being converted to correspondingly ambiguous latitude-longitude coordinate data, is then employed to select the corresponding one of the Omega zones, to thereby resolve the ambiguity of the Omega information. The resolved Omega information is in turn processed to compute new latitude-longitude coordinate data which is thereupon employed to establish the Loran receiver to phase-lock on to the correct cycle of the Loran pulse corresponding to the thus determined time-difference values. Once the Loran-C receiver is thus stepped to lock on to the proper cycle, the Loran position data is thereafter free from ambiguity and can be employed to provide accurate position data of the weather balloon as is desired.

To the accomplishment of the above and to such further objects as may hereinafter appear, the present invention relates to a Loran navigation and tracking system substantially as defined in the appended claims, and as described in the following specification taken together with the accompanying drawings in which:

Figure 1:
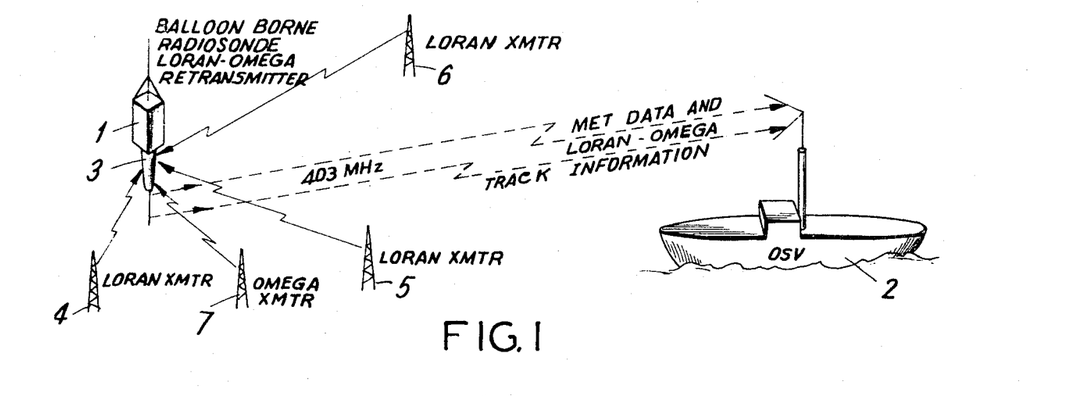
FIG. 1 is a schematic diagram of a weather balloon tracking system employing Loran and Omega technique according to the invention.

FIG. 1 illustrates a typical application of the navigation and tracking system of the invention for tracking the position of a weather balloon carrying a radiosonde 1 which, as noted above, includes meteorological sensors and transducers for transmitting meteorological data to a remote tacking vessel (OSV) 2. The radiosonde 1 also carries a Loran-Omega receiver and retransmitter 3 which receives Loran signals from Loran transmitters 4,5 and 6 and Omega transmitter 7. The retransmitter on the radiosonde transmits meteorological and Loran-Omega tracking data to the tracking station 2, at which the data is processed to produce the desired meteorological, wind speed, and position data. The method and system of the invention is directed at an improved method of tracking the position of the balloon by the combined use of Loran and Omega techniques.

The Omega signals are continuous-wave (CW) in nature as opposed to the pulsed Loran-C signals. The Omega navigation procedure employs the relative phases of the received Omega signals to determine position data and thus suffers from an ambiguity due to the inability of the Omega receiver to identify one transmitted cycle from the next. This difficulty is overcome in pulse navigation systems such as the Loran-C procedure in which position data is determined by the measurement of the time of arrival at the receiver of a given cycle of the received pulse signals. That correct cycle is ordinarily identified by the aid of information contained in the Loran-C signal pulse envelope.

However, when the Loran-C signal is received from a distant retransmitter as from radiosonde 1, it is practically and economically unfeasible to sufficiently preserve the shape of the Loran pulse envelope to enable accurate cycle (commonly the third cycle) identification of the pulse. Since for this reason, accurate cycle identification is not possible, ambiguities are produced in the computed Loran latitude-longitude data.

Figure 2:
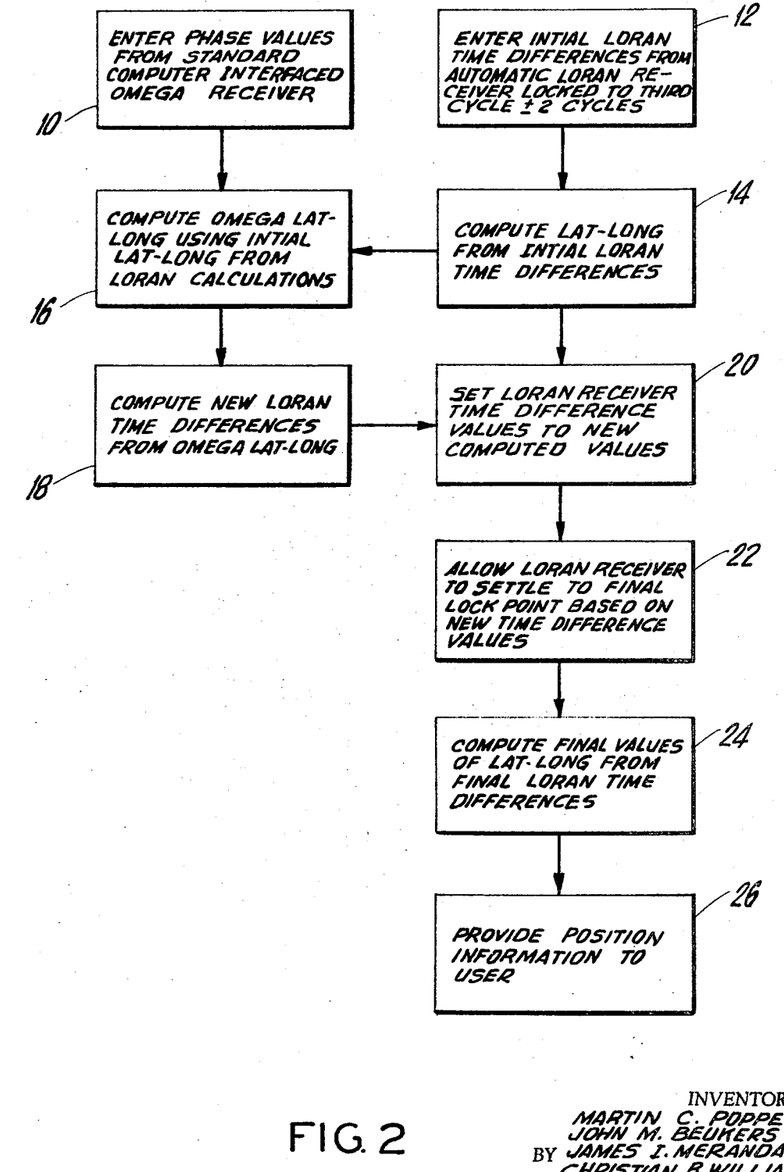
FIG. 2 is a schematic flow-diagram illustrating the major steps in the navigation and tracking method of the invention.

The navigation and tracking method of the invention utilizing Loran-C and Omega navigation signals is described in the block flow-chart diagram of FIG. 2, in which the sequence of the principle operations are shown. Through the method of the invention, the receiver at the tracking station receives both Loran and Omega signals from which it computes ambiguous Loran and Omega position, to wit, latitude-longitude data. The ambiguous Loran-C latitude-longitude data is employed to resolve the Omega position ambiguity, that is, to locate the target position within one Omega zone or lane. That resolved Omega data is in turn employed to resolve the cycle ambiguity in the Loran-C information to enable the Loran receiver to lock on to the proper cycle and thereby obtain accurate position data.

Referring now to FIG. 2, the phase values derived from a standard computer-interfaced Omega receiver are computed and derived as shown in block 10. This operation is standard one well known in the navigation art and is thus not further disclosed herein. At the same time, the retransmitted Loran-C signals are received, and the time difference ($T_D$'s) of the received Loran signals are computed as shown at block 12. As more completely described below in a later part of the application, the Loran-C receiver locks on and thus provides a basis for the time-difference computation at the third cycle plus or minus two cycles of each received Loran-C pulse. The indefiniteness of the cycle identification creates the Loran-C ambiguity that is resolved in a manner to be described.

The ambiguous time difference values are thereafter employed to compute correspondingly ambiguous latitude-longitude data as shown at block 14. The computation of time-differences in a Loran system is a well known procedure and is described, for example, in a report No. N-3-64 published by the Naval Oceanographic Office, entitled "Loran to Geographic Conversion and Geographic to Loran Conversion." As this procedure is considered to be known to those skilled in the art to which the present invention pertains, it is not further described herein.

The ambiguous Loran latitude-longitude data is, however, sufficiently accurate to permit a resolution of the phase ambiguity in the Omega signals. That is, the various phase values computed at 10 for the Omega signals define a plurality of possible Omega ellipses, zones, or lanes in which the retransmitter may be located. As indicated at block 16, the computed ambiguous Loran latitude-longitude data is used to resolve the Omega zone ambiguity and to compute unambiguous Omega latitude-longitude data corresponding to the one of the various possible ambiguous Loran position. That is, the thus selected Omega lane encloses an area corresponding to the time difference between identical cycles of succeeding Loran-C pulses. Thereafter, as shown at block 18, the thus-computed Omega latitude-longitude positional data is thereupon used to compute a set of new Loran time-differences in correspondence to the resolved Omega position data.

Those new time-difference values, which are computed in an inverse manner to the computation of the Loran latitude-longitude data from the ambiguous time-difference values in step 18, is then, as shown at block 20, employed to set the Loran receiver to lock on to pulses having those computed and unambiguous time-difference values. The Loran receiver, as shown at block 22, is then allowed to settle to the final lock points based on these new time-difference values. Thereafter, as shown at block 24, the final accurate Loran latitude-longitude values are computed from the resolved time-differences in a known manner as described above with respect to step 14. As shown at block 26, that latitude-longitude data, which is typically accurate to within 100 feet, is then provided to a utilization device, such as a print-out, chart recorder, or similar device to provide the desired continuous and accurate position data of the remote target.

Figure 3:
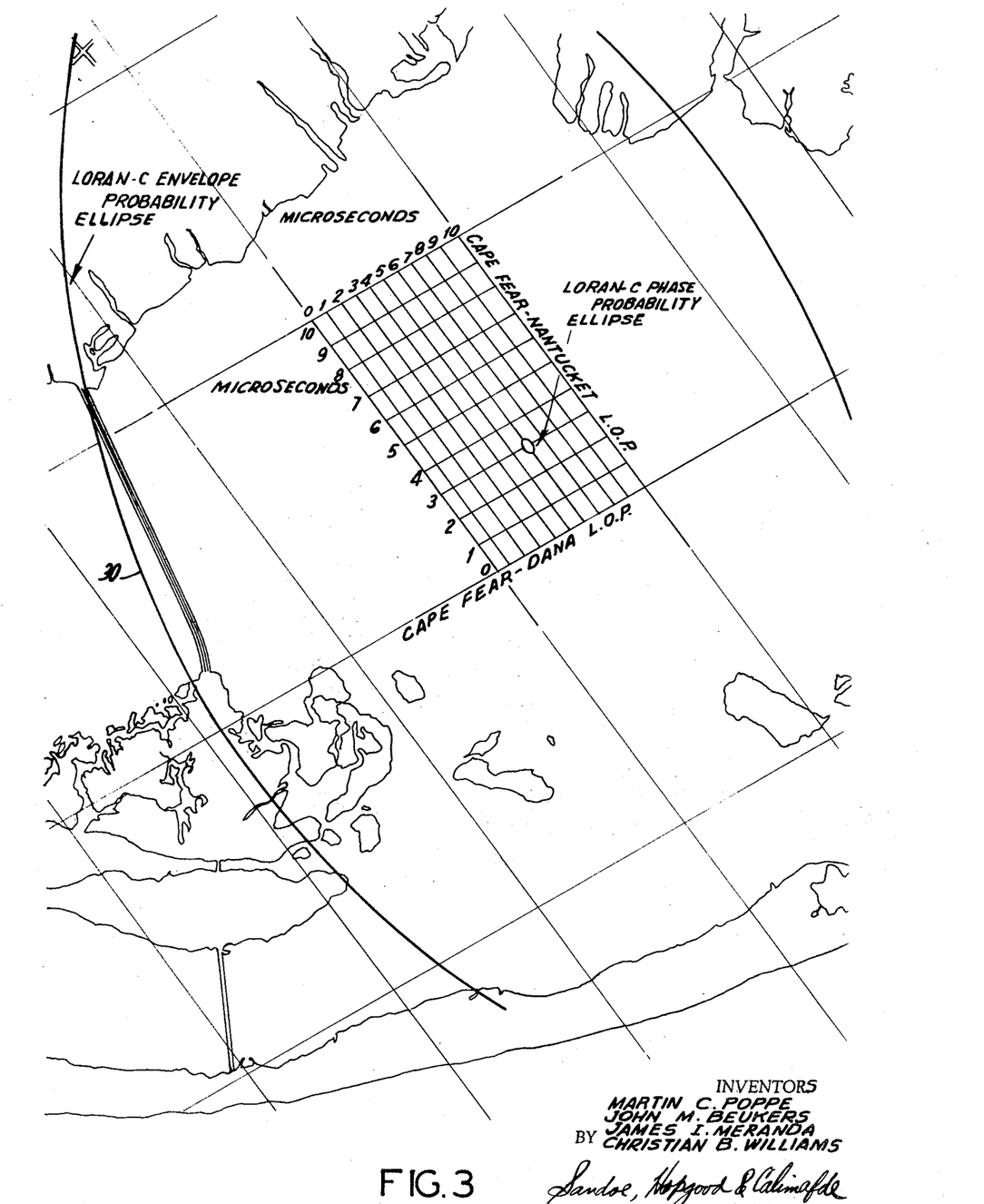
FIG. 3 is a navigation chart illustrating typical Loran geometry.
Figure 4:
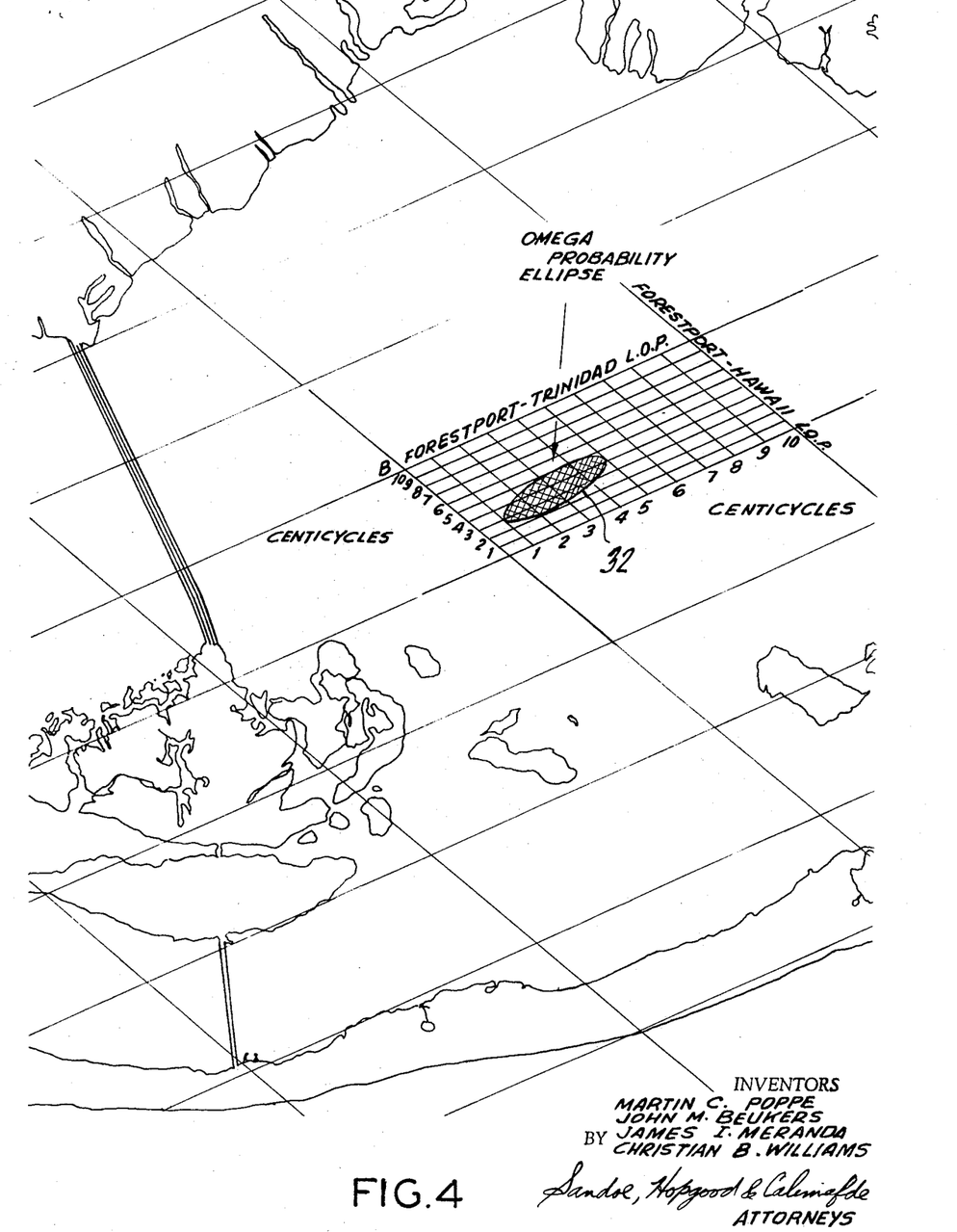
FIG. 4 is a similar navigation chart illustrating typical Omega geometry.

The procedure thus far described may be better understood from an observation of FIG. 3 which illustrates a typical Loran geometry chart, in which the 1 $\sigma$ probability ellipse 30 indicates a Loran probability ellipse that corresponds to the ambiguity resulting from determining the Loran-C cycle to within ± 2 cycles rather than the conventional third-cycle identification that cannot, as previously noted, be achieved when the Loran-C signal is retransmitted. Only a single Omega lane is contained within this ellipse, so that the approximate or ambiguous Loran-C latitude-longitude data that is obtained from the ambiguous cycle time-difference values can be employed to locate the proper Omega lane. FIG. 4 illustrates a typical Omega geometry chart in which the major rectangles represent one tenth of a cycle of Omega. The Omega probability ellipse 32 corresponds to a particular one-cycle of the Loran-C pulses, and this permits, as noted above, the automatic selection of the proper Loran-C cycle.

Figure 5:
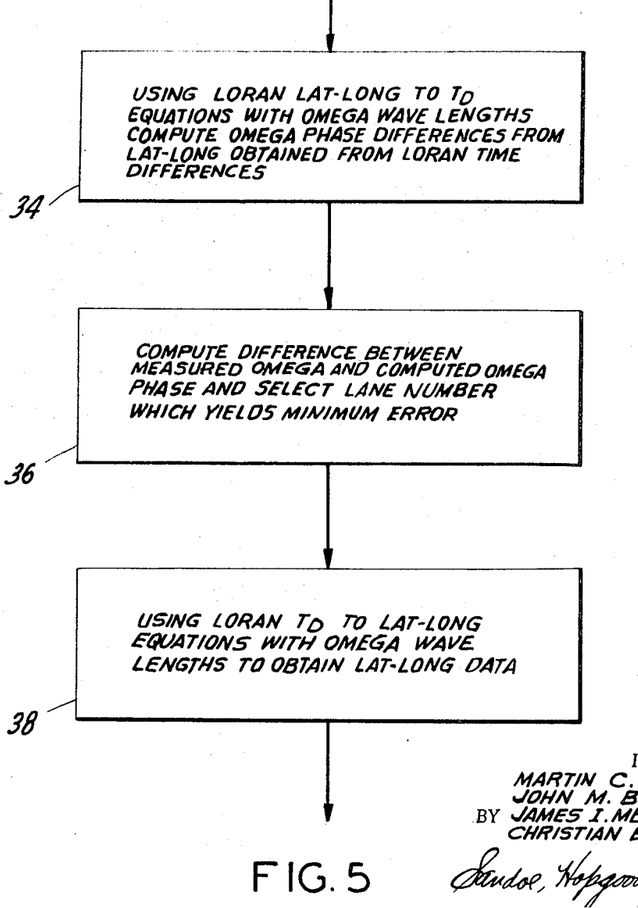
FIG. 5 is a flow-chart in block form illustrating in greater detail the operation described in box 16 of FIG. 2.

The operation performed at block 16 of FIG. 2 in which Omega latitude-longitude data is computed from the calculated Loran time-differences ($T_D$'s) is described in greater detail in FIG. 5. Before describing the operations of FIG. 5, however, it is believed that a preliminary discussion of the concept of Omega lane numbers will be of assistance. In conventional Loran operation, as noted previously, the time-differences are derived from the third cycle of the master pulse and the third cycle of the slave pulse. This value uniquely defines the relative time delay of the arrival of the Loran signals at the receiver. In conventional Omega operation it is not possible after completing a full cycle of Omega phase difference to distinguish the new position from the original position merely by observing the Omega phase differences. This situation establishes the Omega ambiguity described above.

However, by keeping track of how the current Omega values relate to the previously derived phase values, an Omega lane count can be obtained and assigned to the phase measurement. One way of doing this is to start at one point at which the lane count is arbitrarily defined as 500. By proceeding in a direction of increasing phase difference over a full cycle of Omega, the phase measurement returns to its initial value. This signifies that one full Omega cycle has been completed and the lane count is incrementally increased to 501. Similarly, when operating in a decreasing phase direction, after going from 0° to 359°, the lane count is decremented to 499.

The significance of the Omega lane numbers is that by using the Loran latitude-longitude to $T_D$ and Loran $T_D$ to latitude-longitude Programs, and substituting the wave length of the Omega signal for the Loran wave length, the Omega phase difference is obtained not only in terms of the number of degrees of phase difference in a single cycle, but also includes the lane count number. The resultant information permits the resolution of ambiguity of the Omega information and location of a unique spot on the Omega map (FIG. 4). Stated differently, the result of this computation is an unambiguous Omega phase number which includes the lane count. It should be noted that the Omega lane count is a computed rather than a measured value.

Referring to FIG. 5, the first computation operation performed as indicated at block 34 is the derivation of the Omega phase difference with lane identification numbers from the latitude-longitude information provided by the Loran lock-up performed at block 14. This information provides an unambiguous Omega phase position (phase difference plus lane count). The difference between the measured Omega phase difference and the computed Omega phase position is then computed and from that measured phase difference the lane number of the closest Omega lane is assigned as indicated at block 16. For instance, if the computed phase value is 400.99, that is 400 lanes and a phase number of 0.99, and the measured phase is 0.05, the lane number of 401 is assigned to arrive at a final phase value of 401.05. This is done in the computer by subtracting the measured phase number with the computed lane added thereto from the computed phase value, and in addition subtracting the measured value with one plus and one less than the computed lane number, and then taking the one which is arithmetically closest to the computed value. Finally, the measured Omega phase with the corrected lane number (measured phase position) is used in the inverse equation to obtain the latitude and longitude as predicted by the measured Omega phase position as indicated at block 38.

LORAN THIRD CYCLE ± TWO CYCLE LOCK-ON

As noted previously, the ambiguity in the Loran information is a result of the uncertainty of the third cycle lock-on of the retransmitted Loran signal. In the practice of the invention, Loran lock-on is made at either the third cycle plus or minus 2 cycles of the received Loran signals rather than the more typical third-cycle lock-on, to thereby create an ambiguity in the computed Loran latitude-longitude position which is resolved by the use of the resolved Omega position in the manner described above. The manner in which the Loran receiver operates to lock on to the Loran third cycle ± 2 cycles is described in the following portion of the specification with reference to FIGS. 6–11.

This technique is best explained in two parts, first, the organization of the search which is performed on the incoming Loran signals, that is, how the Loran receiver looks at the Loran signal; and second, the specific implementation and general technique that is used to measure the presence or absence of Loran signal energy obtained from the Loran retransmitter at the Loran receiver.

Figure 6:
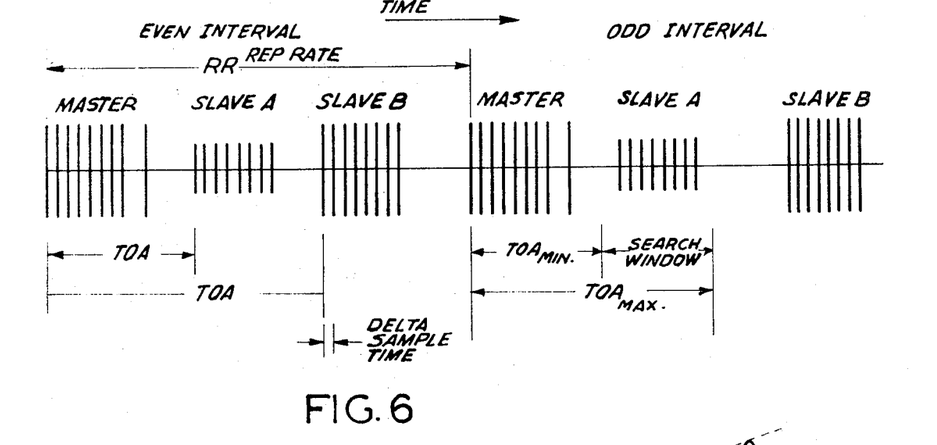
FIG. 6 is a timing diagram of the Loran pulse trains.

The problem of Loran lock-on is illustrated in FIG. 6, which depicts a series of pulses transmitted from the various Loran stations. These pulses are separated in time both by fixed delays at the transmitting site and by an additional delay introduced by the velocity of propagation from the Loran station to the tracking station. The series of pulses labeled Master, Slave A and Slave B in FIG. 6 represent three distinct Loran-C transmission stations. The specific phase coding of the various station pulses differs between the odd and even intervals between the pulses, that is, the Loran stations will either transmit a pulse in phase or out of phase. Nomenclature is indicated beneath the various Loran pulses to better indicate the relation between the pulses, TOA designating the time of arrival of the first pulse of a group with respect to the time of arrival of the first pulse of the master, the time of arrival of the first pulse of the master is assumed arbitrarily with regard to which Loran cycle is being discussed as long as that pulse remain fixed, TOA MINIMUM, and TOA MAXIMUM designating the minimum and maximum times at which the first pulse of the slave A signal is expected to arrive at the Loran receiver location at which the retransmitted Loran signals are received and processed. These times are defined as follows:

1. TOA MINIMUM can never be less than the time of arrival of the station at the processing site because the path length to the processing site through a retransmitter is always longer than a track path from the station.

Figure 7:
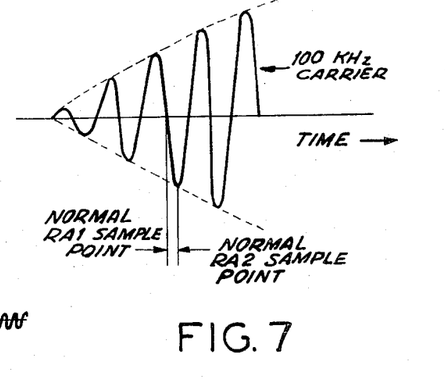
FIG. 7 is a pulse diagram on an expanded time scale of a typical Loran pulse.

2. TOA MAXIMUM is dependent upon the longest round trip that the first pulse of Slave A could take in arriving at the receiver location, that is, from the Loran station through the retransmitter to the tracking station. The difference between TOA MINIMUM and TOA MAXIMUM defines a search window, as indicated in FIG. 6. In the third cycle lock-on technique employed in the invention the search for the Loran pulse is initiated at time TOA MINIMUM and proceeds toward TOA MAXIMUM. A typical Loran pulse on an enlarged scale is shown in FIG. 7, which shows the cycles of the pulse zero increasing from zero amplitude to an undefined amplitude. The search for the Loran third cycle ± 2 cycles takes place in several states and proceeds as follows: (A Loran receiver capable of performing these operations is more completely described below with reference to FIG. 11).

State 0 — In state 0 the Loran pulses pass through a narrow band RF filter which serves to reduce the amount of noise but does not completely distort the shape of the pulse. Starting at time TOA MINIMUM the input is sampled to see if there is any signal present at that time. If there is no signal at that time, the time of the search is increased by approximately 50 microseconds and signal sampling is performed in this new location. The search is continued in time from TOA MINIMUM towards TOA MAXIMUM in increments of approximately 50 microseconds. At each increment a search is made for coherent 100 kHz energy which would be indicative of having sampled inside the Loran pulse. When an energy search in State 0 indicates the presence of Loran energy, the operation is shifted to state 1.

State 1 — In state 1 the input bandwidth is switched to wide band to preserve the character of the pulse with greater fidelity. In this state a check is once again made to make sure that there is sufficient energy to continue operating on the signal. If the presence of signal energy is not confirmed in State 1, the receiver operation reverts back to State 0 and the search for Loran signal energy is renewed. If Loran energy is detected in State 1, the tracking system is aligned with one of the zero crossings of the Loran pulse and the receiver then searches for the presence of Loran signal energy at the peak of the cycle following that zero crossing. Starting at the point TOA, at which the search was stopped in State 0, the search now proceeds for the front edge of the pulse in State 2.

Figure 8A:
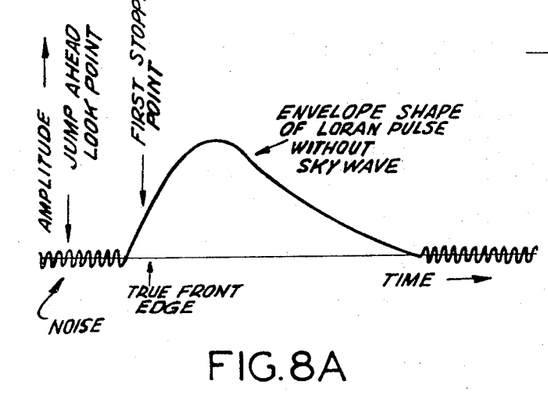
FIGS. 8A and 8B are waveforms of typical Loran pulses indicating the effect of skywave reflections.
Figure 8B:
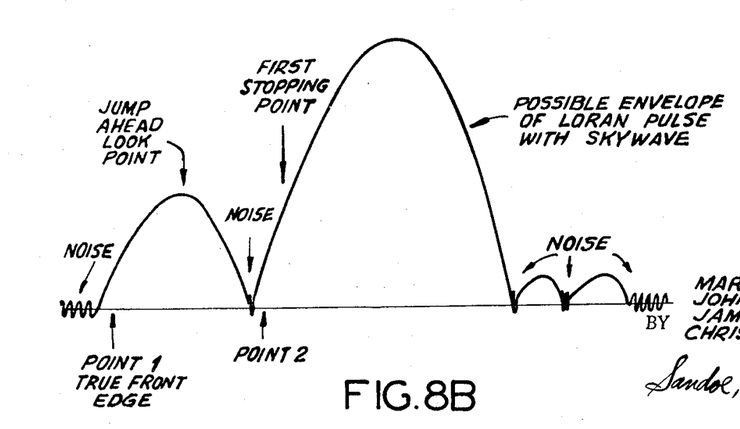

State 2 — In State 2 the look time TOA is increased towards TOA MINIMUM in increments of only 10 microseconds or one cycle at a time. This procedure is continued until the amplitude of the Loran pulse is reduced from a desired level to, or a specified amount below, the background noise level. This point is defined as a known point, which is typically directly in front of or one of the first two cycles of the Loran pulse. At this point, 30 microseconds or three cycles are added to the sampling time. At this point, the third cycle ± 2 cycles of the Loran pulse has been located as desired. It should be noted that in the State 2 search for the front edge of the pulse, an alternate scheme is possible where the search is continued until the signal-to-noise ratio which is known to exist at the third cycle, is detected. In this case, the search is terminated rather than shifting back 30 microseconds. Having obtained the desired point of lock-on, the Loran-C receiver proceeds to track that zero crossing of the 100 kHz pulse (and, in fact, for additional security track that same cycle on all eight pulses say of Slave A) until it is commanded to a new point, either by the receiver operator or computer intervention. The scheme as described will work correctly provided that the pulse does not have any nulls in its middle. A null in the middle of the pulse will be caused by the addition of Loran pulses arriving at the receiving station by way of different paths, typically directly following a path which bounces off the ionosphere. In the case in which ionospheric or skywave paths are present, the pulse does not have a simple rising and falling nature as shown in FIG. 8A, but rather has several nulls in its middle as shown in FIG. 8B. When this occurs, the locking procedure described above must be modified to ensure that searching does not begin, for example, on the middle lobe and finally acquire at point 2 on FIG. 8B. To do this, an additional state is added after State 2 in which the lock time TOA is jumped ahead of the stopping point obtained in State 2. If the pulse is similar to the one shown in FIG. 8A, sampling will occur in front of all the pulse energy, and thus only noise will be sampled, and the decision will be made that the point of stopping was truly the front edge of the pulse. If the pulse resembles that of FIG. 8B and the first stopping point is at point 2, the jump ahead will start sampling signal energy at a point in the middle of the first lobe. Detecting energy at this point, the processor then reverts to State 1 and proceeds through State 2 to come to rest finally on the true front edge of the pulse at point 2.

LORAN ENERGY DETECTION

To detect the presence or absence of the Loran signal at time TOA, the input waveform is sampled and recorded to determine if the signal at that time is + or −, or +1 or −1, rather than detecting the actual signal amplitude. The amount of signal present with respect to the noise is determined by the ratio of samples which are +1's to those which are −1's. If, for instance, sampling is performed on the typical pulse shown in FIG. 7, at the point marked NORMAL RA2 SAMPLE POINT, a −1 or a negative value for the pulse would be recorded except in those cases in which the noise was so large as to override the signal and cause the signal at that time to be positive. If, on the other hand, random noise which has a random distribution of positive and negative going times, is being sampled, an even number of +1's and −1's will be sampled.

Figure 9A:
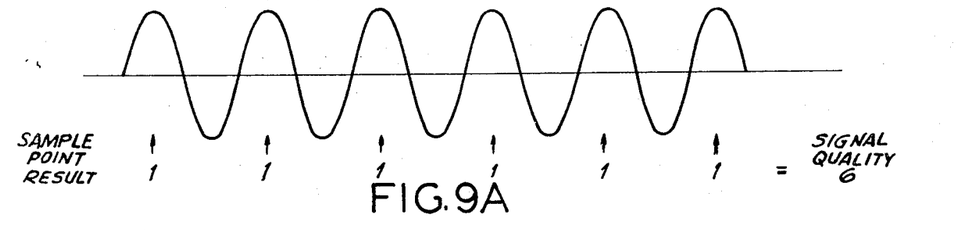
FIGS. 9A–9C are representative waveforms illustrating the manner of measuring the signal quality of the received Loran signals in the third cycle ± 2 cycles lock on technique of the invention.
Figure 9B:
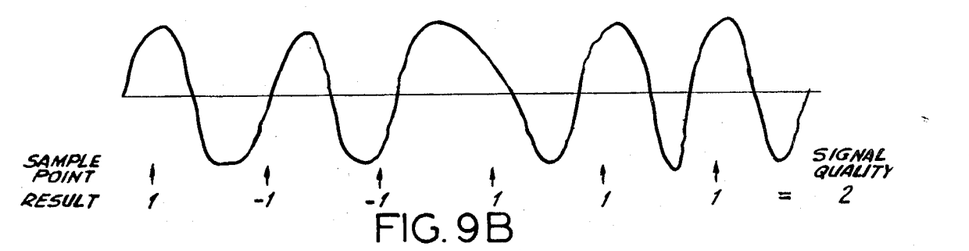
Figure 9C:
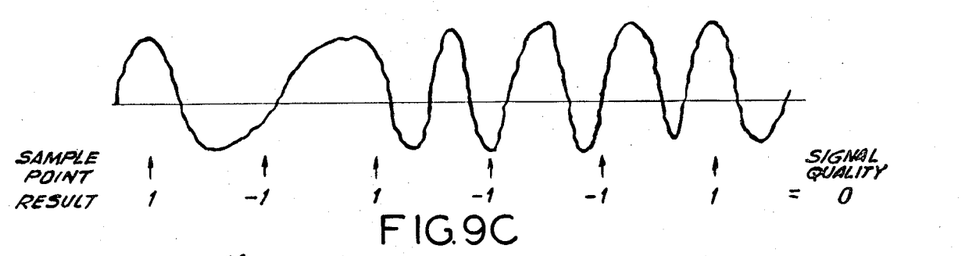

To clarify this technique, there is shown a signal without noise (FIG. 9A), a signal with a low noise level (FIG. 9B), and a signal with an extreme amount of noise (FIG. 9C). For simplicity there is shown in FIG. 9 a continuous sine wave which is sampled each cycle in contrast to Loran in which only one cycle per pulse is sampled. The sampling technique, however, is basically the same.

Having employed a technique of sampling for the + or − values of the signal to measure its energy content, it is next desirable to use this information in a manner which produces a signal-no-signal decision in a short amount of time, based on a definable threshold criteria. To do this, an equation is implemented which insists that the sampled signals have a certain excess of +1's over −1's. Lacking this excess, the function goes to and stays very nearly equal to zero; exceeding the number of 1's causes it to grow very rapidly. The advantage of this function is that this rapid growth or reduction to zero based on a defined threshold can be quickly and easily detected and is also easily implemented such as is shown in the signal quality circuit of FIG. 10.

Figure 10:
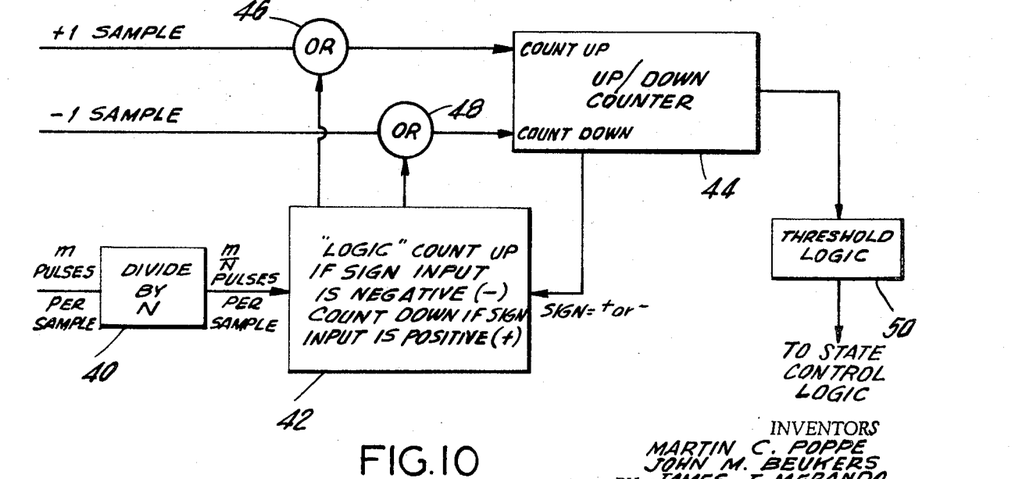
FIG. 10 is a schematic diagram of the signal quality determining circuit employed in the Loran receiver.

Referring now to FIG. 10, the signal quality circuit receives a number of $m$ pulses for each sampling operation at a divide-by-N circuit 40, which produces at its output $m/N$ pulses each sampling period ($m$ and N are adjustable). The latter series of pulses are applied to one input of a logic circuit 42 which produces either a count "up" or a count "down" signal in response to a sign + or − signal obtained from an up/down counter 44.

Counter 44 includes a count down control and count up control and counts in the up direction when the latter is activated, and counts down or decreases its count when the former is activated. The +1 sample signals are applied through an OR gate 46 to the counter to activate the count up control, and the −1 sample signals are applied to the counter to activate the count down control through an OR gate 48.

Two different signals are permitted to activate the up and the down count inputs. If the signal is sampled and the results are +, the up count input is activated for one count. If the signal is sampled and the results are −, the down count input is activated for one count. Divide-by-N circuit 40 tends to prevent counter 44 from going in the direction in which it is currently going. Therefore, if counter 44 is storing a positive number, which means that it has been counting up more than down, the $m/N$ pulses which occur for each sample pulse forces counter 44 to count in the downward direction. On the other hand, if the number in counter 44 is negative, for each sample pulses which are taken, counter 44 is incremented upward by $m/N$ counts. By this scheme, the number stored in counter 44 is forced to be very close to zero unless the number of plus inputs from sampling the signal exceeds $m/N$ symmetry. If the signal is being sampled at a negative amplitude point, the number of down counts must exceed $m/N$ so that the rate at which counter 44 counts down is in excess of the rate at which the circuit will cause itself to count up.

The output of counter 44 is applied to a threshold logic circuit 50. When the count of counter 44 indicates a predominance of plus inputs to the counter, that condition is sensed by logic circuit 50, which thereupon produces a signal present signal to the state control logic described below with reference to FIG. 11, to indicate to the latter that a sufficient amount of coherent Loran signal energy has been received to enable lock-on of the Loran receiver at the third cycle ± 2 cycles.

LORAN-C RECEIVER

Figure 11:
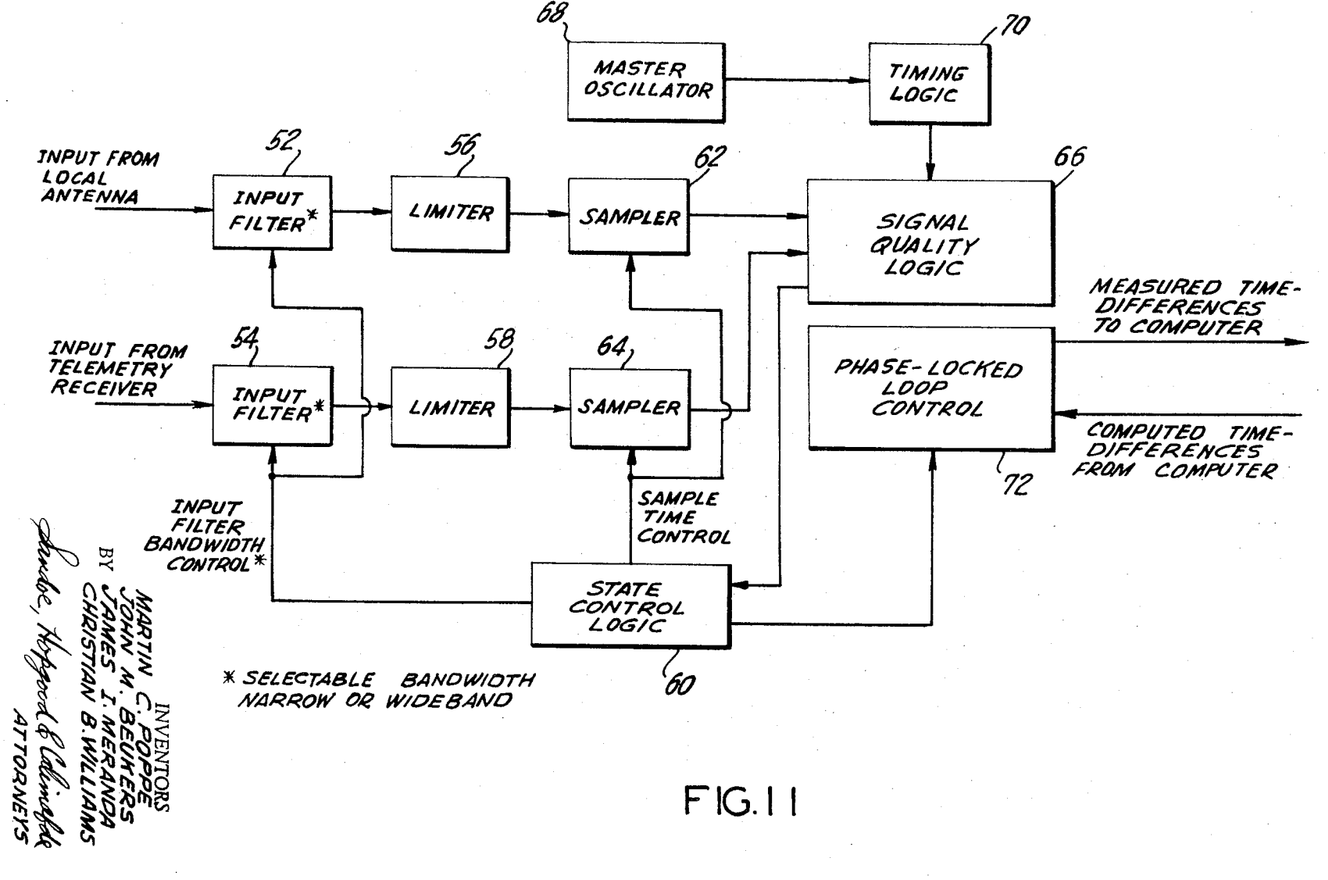
FIG. 11 is a schematic diagram in block form of a portion of the Loran receiver including the signal quality circuit of FIG. 10.

The Loran-C receiver for performing the third cycle ± 2 cycles lock-on operation that has just been described is shown in FIG. 11. As shown therein, the inputs to the Loran-C receiver are derived from a local antenna input as well as from a remote telemetry receiver input which in turn receives the retransmitted Loran signal. The local input Loran signal is employed to provide an initial reference time difference to establish the sampling or searching of the received telemetry Loran signal at an appropriate position. These inputs are passed through input filters 52 and 54 respectively which suppress and thus limit the amount of outer band noise that is applied to limiters 56 and 58 respectively coupled to the outputs of filters 52 and 54.

As described above, during the initial searching of the Loran signal in State 0, filters 52 and 54 are switched by a bandwidth control signal supplied by a state control logic circuit 60 to a narrow band mode, to permit a more rapid aquisition of the Loran signal into the general area of the pulse as a result of the greater rejection of noise by a narrow band filter.

The state control logic circuit 60 keeps track of which state the receiver is in based on an examination of the signal quality or the presence or absence of a signal. The design and manner of operation of the state control logic is believed to be well known to those having ordinary skill in the design of Loran receivers and is thus not further discussed herein so as not to unnecessarily encumber the disclosure of the invention.

The outputs of limiters 56 and 58 are each bi-level signals, that is, the limiter outputs are either 0 of 1 (or −1 and +1) signals. The transition of these bi-level signals between the 0 and 1 levels correspond to the zero crossings of the original input signals plus noise.

The output bi-level signals of limiters 56 and 58 are respectively applied to the inputs of signal samplers 62 and 64 which sample the limiter output signals to determine if at the sampling time the signal is at a plus or a zero (or minus) level. These plus and zero levels are applied to the inputs of a signal quality and phase-locked loop logic circuit 66, which includes the elements shown schematically in FIG. 10, at which the bi-level signals from the limiters are processed in the manner described above. The m timing pulses used in the signal quality circuit of FIG. 10 are derived from a master oscillator 68 which applies a series of timing signals to a timing logic circuit 70. The latter processes those signals to produce the $m$ pulses per sample employed in the signal quality circuit.

When the state control logic circuit 60 receives a signal present signal from the signal quality loop in signal quality logic circuit 66, it in turn generates an intracking state signal which is applied to the input of a phase locked loop 72. The latter in response to those signals causes the Loran receiver to phase lock on the detected Loran signal and to compute the ambiguous Loran time differences which are processed along with the ambiguous Omega position data to precisely determine the location of the target as described above.

The design and manner of operation of phase-locked loop control circuit 72 is also not further described herein since its design and operation is considered to be within the knowledge of any skilled engineer in the field of Loran navigation receivers. For a more complete description of this circuit reference is made to a U. S. Coast Guard publication, entitled "The Loran-C System of Navigation," by Jansky and Bailey, published in February, 1962, or in "Microminiature Loran-C Receiver/Indicator" by R. A. Reilly, published in the IEEE Transactions or Aerospace and Electronic Systems, Vol. AES-2, No. 1, January, 1966, which are incorporated by reference herein.

The method and system of the invention thus permits precise and unambiguous data tracking of a remote target containing a Loran telemetry retransmitter. The ambiguities of the Loran data, which result from the inability of the Loran receiver to positively and unerringly lock on to the third cycle of succeeding Loran-C pulses, is resolved by the use of Omega navigation techniques.

The tracking system and method of the invention thus permits the accurate tracking of remote targets such as a weather balloon carrying a radiosonde. The invention may also be used in determining the position of an individual who is carrying the Loran-Omega transmitter on his back. The invention is highly advantageous as it permits the use of Loran telemetry without requiring the expensive redesign of the Loran retransmitter that would ordinarily be necessary to ensure reliable third-cycle identification at the Loran receiver, since all that is required in the present invention is that lock on be achievable at two cycles on either side of the third cycle.

Whereas, the invention has been herein specifically described with respect to one of its embodiments, it will be apparent that modifications may be made therein all without departing from the spirit and scope of the invention.

We claim:

1. A method for determining the position of an object at a tracking station remote from said object, said method comprising the steps of receiving at said tracking station a first ambiguous position signal from said object, computing first ambiguous position data from said first ambiguous position signal, receiving at said tracking station a second ambiguous position signal from said object, computing second ambiguous position data from said second ambiguous position signal, resolving the ambiguity of said first ambiguous position data in accordance with said second ambiguous position data to obtain first unambiguous position data, thereafter resolving the ambiguity of said second ambiguous position data in accordance with said first unambiguous position data to obtain unambiguous second position data, and thereafter computing accurate latitude-longitude position data of said object in accordance with said unambiguous second position data.

2. The method of claim 1, in which said first ambiguous position signals include Omega signals, and said second ambiguous position signals include Loran-C signals.

3. The method of claim 2 in which said second position signal receiving step includes the step of determining the time differences between indeterminate cycles of succeeding ones of said Loran-C pulse signals, said second ambiguous position data computing step including the step of computing Loran latitude-longitude data corresponding to said thus determined time differences.

4. The method of claim 3, in which said second ambiguous position signal receiving step comprises the step of locking on to an indeterminate cycle at the leading edge of each of said Loran-C pulse signals.

5. The method of claim 4, in which said locking on step comprises the step of locking on to one of the third cycle plus or minus two cycles in each of said Loran-C pulse signals.

6. The method of claim 5, in which said locking on step further comprises the step of scanning said received Loran-C pulse signals, and terminating said scanning step upon the detection of a predetermined level of Loran-C signal energy with respect to a reference level.

7. The method of claim 2, in which said first ambiguous position data resolving step includes the step of computing Omega latitude-longitude data from said ambiguous Loran latitude-longitude data, said thus-computed Omega latitude-longitude data comprising said first unambiguous position data.

8. The method of claim 7, in which said second ambiguous position data resolving step includes the step of computing new Loran time difference values from said computed Omega latitude-longitude data.

9. The method of claim 8, in which said second ambiguous position signal receiving step comprises the step of locking on to an indeterminate cycle at the leading edge of each of said Loran-C pulse signals.

10. The method of claim 9, in which said locking on step comprises the step of locking on to one of the third cycle plus or minus two cycles in each of said Loran-C pulse signals.

11. The method of claim 8, in which said accurate position data computing step includes the step of setting the Loran-C receiver to lock on to said new Loran time difference values.

* * * * *